J. W. MILLER.
CLIP FOR ATTACHING TO WIRES.
APPLICATION FILED JULY 3, 1918.

1,284,918.

Patented Nov. 12, 1918.

Inventor
John W. Miller.
By Henry L. Reynolds
Attorney

Witness

UNITED STATES PATENT OFFICE.

JOHN W. MILLER, OF SEATTLE, WASHINGTON, ASSIGNOR TO BOEING AIRPLANE COMPANY, OF SEATTLE, WASHINGTON, A CORPORATION OF WASHINGTON.

CLIP FOR ATTACHING TO WIRES 1,284,918.      Specification of Letters Patent.      Patented Nov. 12, 1918.

Application filed July 3, 1918. Serial No. 243,207.

*To all whom it may concern:*

Be it known that I, JOHN W. MILLER, a citizen of the United States, and resident of the city of Seattle, county of King, and State of Washington, have invented certain new and useful Improvements in Clips for Attaching to Wires, of which the following is a specification.

My invention relates to apparatus employed for connecting wires to other objects in order to resist the tension thereof and consists of what may be called a clip or clevis of an improved construction.

The object of my invention is to provide a fitting for use in the many places where wires are used under tension, whereby the wire may be secured thereto in an efficient manner and one in which the bending of the wire may be done upon a fairly large circle and also a clevis of a design which may be cheaply made and also light in weight.

The features of my invention which I deem to be new and which I desire to patent will be hereinafter described and then particularly pointed out in the claims which terminate this specification.

The accompanying drawings show my invention embodied in the type of construction which I now prefer to use.

My invention is more particularly designed for use in connection with the construction of airplanes but it is, of course, adapted for use for any purpose where it is desired to use wires as tension members. The composition of wire which has the greatest strength for a unit of area and weight, is one which makes it undesirable to bend the wire too sharply, as by doing so, its strength is reduced and it is liable to become fractured. In consequence, it is desirable to have the members to which the wire is directly connected, made of comparatively large diameter, keeping as large as possible the bend of the wire which encircles the member to which it is attached.

Figure 1:
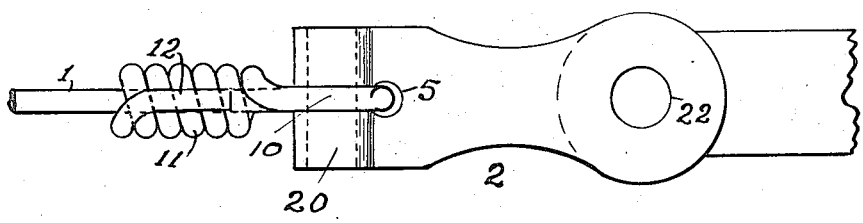
Figure 1 is a view of the flat side of the clevis showing the manner of attaching a wire thereto and of attaching the clevis to another or supporting object.
Figure 2:
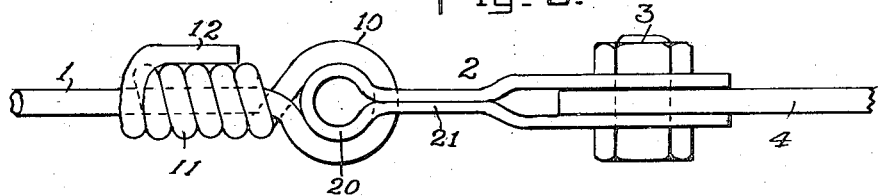
Fig. 2 is an edge view of the same parts.

The manner of joining a wire to another object such as is shown in Figs. 1 and 2, is an efficient and also a cheap manner of doing this work. This forms an eye 10 which passes around a pin or other round object forming part of, or secured to, a member to which the wire is to be secured. The end of the wire is then formed as a coil, 11, closely encircling the body of the wire, 1. In the joint as shown, the tip of the wire 12, is bent backward and lies close against the outer surface of the coil, 11. In making such a joint, it is customary to bind the parts of this joint securely together by the use of solder.

The clip, 2, is made of a piece of thin sheet metal which, centrally of its length, is bent upon itself and the bend made in such shape as to form a hollow, cylindrical head, 20. The purpose of this is to furnish a surface of material size to receive the eye, 10, formed in the end of the wire.

The shank, 21, of the clevis or clip, has the two portions thereof held in contact. Preferably, these are secured by spot welding, brazing, or like process, so that the two parts of the shank are, in effect, integral.

The other end of the clevis is provided with means by which it may be secured to another object such, as the holes, 22, which are adapted to receive a bolt or pin, 3, which also passes through the object to which the clip is to be anchored, as the bar, 4.

Figure 3:
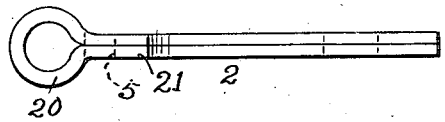
Fig. 3 is an edge view of the clevis alone, slightly modified in construction, although the essential principles remain the same.

The clip, as above described may have its ends separated as shown in Fig. 2 so that it may span a plate or bar to which it is secured, or these ends may be held close together as shown in Fig. 3. This is an immaterial variation and the clip may be made in whichever style best suits the particular needs to which it is to be put.

The shank, 21, of the clip is provided with a hole, 5, located so that one edge thereof is substantially tangent with the continuation of the cylindrical outer surface of the head, 20. This hole is of such size as to receive the wire which is to be attached to the clip. When the wire is placed through the clip the outer edge of this hole, against which the pull of the wire is sustained, being substantially a continuation of the cylindrical outer surface of the head, 20, the effect is the same as if it was being bent around a pin of this size, having the diameter of the head, 20. This being of material size as compared with the thickness of the plate from which the clip is made, forms an eye in the wire of large diameter and therefore contributes to its strength. As the head, 20, is of material length, that is, in the direction transversely of the clip, it will offer considerable resistance to compression. This is also a characteristic of all cylindrical shells to act as an arch to resist compression.

I have found that a clip of this kind may be cheaply and rapidly made, is light in weight and forms a very desirable means for connection of wires to other parts.

What I claim as my invention is:

1. A clip for wire connections having a transversely extending cylindrical head at one end and a hole through the body thereof which substantially intersects the inner outline of said head.

2. A clip for wire connections having a transversely extending cylindrical enlargement at one end provided with an axial bore the web having a wire receiving hole having one edge substantially intersecting the exterior outline of said cylindrical head.

3. A clip for wire connections having a flat web and a cylindrical head extending transversely along one end of said web, said web having a wire-receiving hole intersecting the exterior surface of said head, said web also having a pivot hole in its other end.

4. A clip for wire connections composed of a wrought metal strip bent upon itself to form a hollow cylindrical head at one end of the completed clip and a flat web said web having a wire receiving hole passing therethrough and substantially intersecting the outer surface of said head.

5. A clip for wire connections composed of a strip of rolled metal bent centrally upon itself to form a hollow cylindrical head and a flat web, said head being of a diameter materially greater than the thickness of the web, the two parts of said web being integrally joined adjacent said head and having a wire-receiving hole which touches the outer surface of said head, the other end of the web having holes for receiving a securing pin.

Signed at Seattle, Washington, this 27th day of June, 1918.

JOHN W. MILLER.